United States Patent
Bradley et al.

(10) Patent No.: US 9,594,370 B1
(45) Date of Patent: Mar. 14, 2017

(54) PORTABLE USER INTERFACE FOR TEST INSTRUMENTATION

(75) Inventors: Donald Anthony Bradley, Morgan Hill, CA (US); Mark Robert Lasher, San Jose, CA (US); Calvin Carter, San Jose, CA (US)

(73) Assignee: ANRITSU COMPANY, Morgan Hill, CA (US)

( * ) Notice: Subject to any disclaimer, the term of this patent is extended or adjusted under 35 U.S.C. 154(b) by 157 days.

(21) Appl. No.: 12/981,299

(22) Filed: Dec. 29, 2010

(51) Int. Cl.
*G06F 11/00* (2006.01)
*G05B 23/00* (2006.01)

(52) U.S. Cl.
CPC ................... *G05B 23/00* (2013.01)

(58) Field of Classification Search
CPC ............ H04B 17/0042; G01R 29/0835; G01N 29/226; G01N 29/2481; G01N 29/449; G01N 29/46; G01N 2291/2697; G01N 29/14; G05B 23/02
USPC .................. 702/188, 57, 189, 182, 183, 108
See application file for complete search history.

(56) References Cited

U.S. PATENT DOCUMENTS

| | | | |
|---|---|---|---|
| 6,049,301 A * | 4/2000 | Weagant | 342/13 |
| 8,000,656 B1 * | 8/2011 | Jiao et al. | 455/67.11 |
| 9,429,992 B1 * | 8/2016 | Ashenbrenner | G06F 1/1632 |
| 2004/0152429 A1 * | 8/2004 | Haub et al. | 455/102 |
| 2006/0040617 A1 * | 2/2006 | Haub et al. | 455/67.13 |
| 2008/0033681 A1 * | 2/2008 | Ziomek | G01R 31/3025 702/108 |
| 2009/0112524 A1 * | 4/2009 | Schiefer | 702/188 |
| 2010/0115437 A1 * | 5/2010 | Engel | H04L 67/36 715/764 |
| 2010/0117693 A1 * | 5/2010 | Lorg et al. | 327/156 |
| 2011/0025261 A1 * | 2/2011 | Bersenev | 320/107 |
| 2011/0035186 A1 * | 2/2011 | Liu et al. | 702/182 |
| 2011/0224923 A1 * | 9/2011 | Blair et al. | 702/57 |
| 2012/0156034 A1 * | 6/2012 | Sabannavar et al. | 416/1 |

* cited by examiner

*Primary Examiner* — Gregory J Toatley
*Assistant Examiner* — Eman Alkafawi
(74) *Attorney, Agent, or Firm* — Tucker Ellis LLP

(57) ABSTRACT

In accordance with an embodiment, a measurement system includes a measurement instrument, a controller physically connected to the measurement instrument, and a portable user interface wirelessly connected to the controller. The portable user interface is operable to remotely monitor and control the measurement instrument.

21 Claims, 5 Drawing Sheets

PORTABLE USER INTERFACE FOR TEST INSTRUMENTATION

BACKGROUND

Technical Field

The present invention relates to test instruments including a passive intermodulation (PIM) measurement instrument, and in particular to a portable user interface for test instrumentation.

Related Art

A PIM is an unwanted signal or signals generated by the non-linear mixing of two or more frequencies in a passive device such as a connector or cable. PIM has surfaced as a problem for cellular telephone technologies such as Global System for Mobile Communications (GSM), Advanced Wireless Service (AWS) and Personal Communication Service (PCS) systems. Cable assemblies connecting a base station to an antenna on a tower using these cellular systems typically have multiple connectors that cause PIMs that can interfere with system operation.

The PIM signals are created when two signals from the same or different systems mix at a PIM point such as a faulty cable connector. If the generated PIM harmonic frequency components fall within the receive band of a base station, it can effectively block a channel and make the base station receiver think that a carrier is present when one is not. PIMs can, thus, occur when two base stations operating at different frequencies, such as an AWS device and a PCS device, are in close proximity.

The PIMs can be reduced or eliminated by replacing faulty cables or connectors. Test systems can be utilized to detect the PIMs enabling a technician to locate the faulty cable or connector. The test system to measure the PIMs, thus, creates signals at two different frequencies, amplifies them, and provides them through cables connecting a base station to antennas on a tower for the base stations. A return signal carrying the PIMs is filtered to select a desired test frequency harmonic where PIMs can be detected and the PIM measurement is provided to an operator.

PIM testers to date have used CW signals for the two frequencies used to create the PIM. This is due to the unknown nature of where physically the PIM is located in the transmission path. The PIM is monitored by one technician while the other technician climbs the tower and physically moves the connector joints to see if the PIM changes. Other techniques plot a time graph of the PIM so a single technician can correlate his movement up the tower with results on a graph provided on a plotter below the tower.

FIG. 1 shows a block diagram of components of a prior art test system for measuring PIM. As shown in FIG. 1, the system includes a controller 100, such as a PC, and a measurement instrument 102. In this example the measurement instrument measures PIM. The controller includes a CPU 106, Display 108 and User Input device 110. The controller is connected to the measurement instrument via interface 112. The measurement instrument provides an RF signal 114 to measurement engine 116.

In test systems of the prior art, the controller and the measurement instrument can be packaged separately and then physically connected using a common interface such as GPIB, RS232, or USB which provides a tethered form of remote control. In other test systems, the controller and the measurement instrument are packaged into a single instrument package 118. Such a test system can then be connected to whatever device or system is under test, for example it can be connected at a base station to test the base station to the antennas.

As described above, such test systems often require more than one technician to be used properly. This can be because these test systems are largely immobile once they are positioned for testing. That is, they cannot be carried with the technician as he or she climbs the tower or performs other visual inspections. Thus, one technician is left with the test system while a second technician visually and manually inspects the cables, connectors and other potential PIM sources in the surrounding environment, separating the technicians by up to several hundred meters. These multi-person systems can add time and costs to the diagnostic process. Further, although some systems enable a single technician to use them, these systems plot PIM against time. While this allows the technician to correlate his actions as he climbs a tower to the incidence of PIM on the line, it does not provide the technician with real time information because the test system cannot be used while the technician climbs the tower or surveys the surrounding area.

SUMMARY

In accordance with an embodiment, a measurement system comprises a measurement instrument, a controller physically connected to the measurement instrument, and a portable user interface wirelessly connected to the controller. The portable user interface is operable to remotely monitor and control the measurement instrument. The measurement instrument can be a passive intermodulation (PIM) tester or other instrument that can benefit from wirelessly decoupling the user interface from the instrument package.

In accordance with an embodiment, a portable user interface for test instrumentation comprises a computer including a computer readable medium and processor operating thereon. The portable user interface also includes a user input device and a wireless transceiver. The wireless transceiver is operable to wirelessly connect the portable user interface to one of a plurality of measurement instruments. The portable user interface further includes an operating system executing on the computer and a plurality of applications which are each associated with a different measurement instrument. The user input device can include a keyboard, an array of one or more buttons, a touchpad and/or a touchscreen. The wireless transceiver can include a bluetooth transceiver; an industrial, scientific and medical (ISM) transceiver; a ZigBee transceiver; or any wireless transceiver operable to communicate over one or more wireless frequencies.

BRIEF DESCRIPTION OF THE DRAWINGS

Further details of the present invention are explained with the help of the attached drawings in which.

DETAILED DESCRIPTION

In accordance with an embodiment, a measurement system comprises a measurement instrument, a controller physically connected to the measurement instrument, and a portable user interface wirelessly connected to the controller. The portable user interface is operable to remotely monitor and control the measurement instrument. The measurement instrument can be a passive intermodulation (PIM) tester or other instrument that can benefit from wirelessly decoupling the user interface from the instrument package, such as a VNA or spectrum analyzer.

Figure 1:
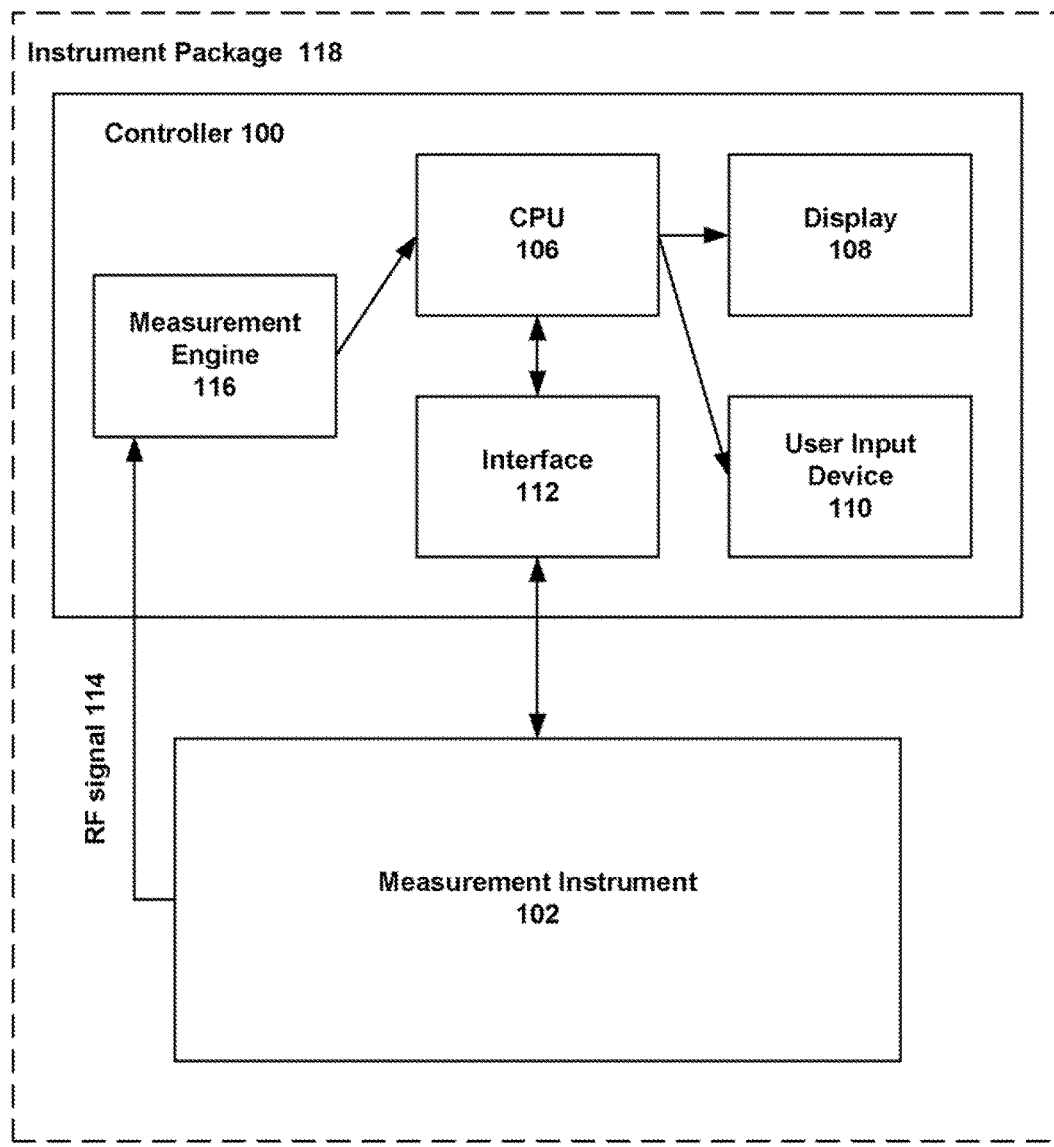
FIG. 1 shows a block diagram of components of a prior art test system for measuring PIM.

Typical test systems, such as that described above with respect to FIG. 1, generally include large and bulky instruments. For PIM testers, this is often due to the attempt to make the hardware contained in each PIM tester as broadband as possible, which can require large, high power components and similarly large built-in cooling systems. Such large and unwieldy systems impose additional costs in the form of additional needed technicians and by limiting the maneuverability and placement and user access to such systems.

Figure 2:
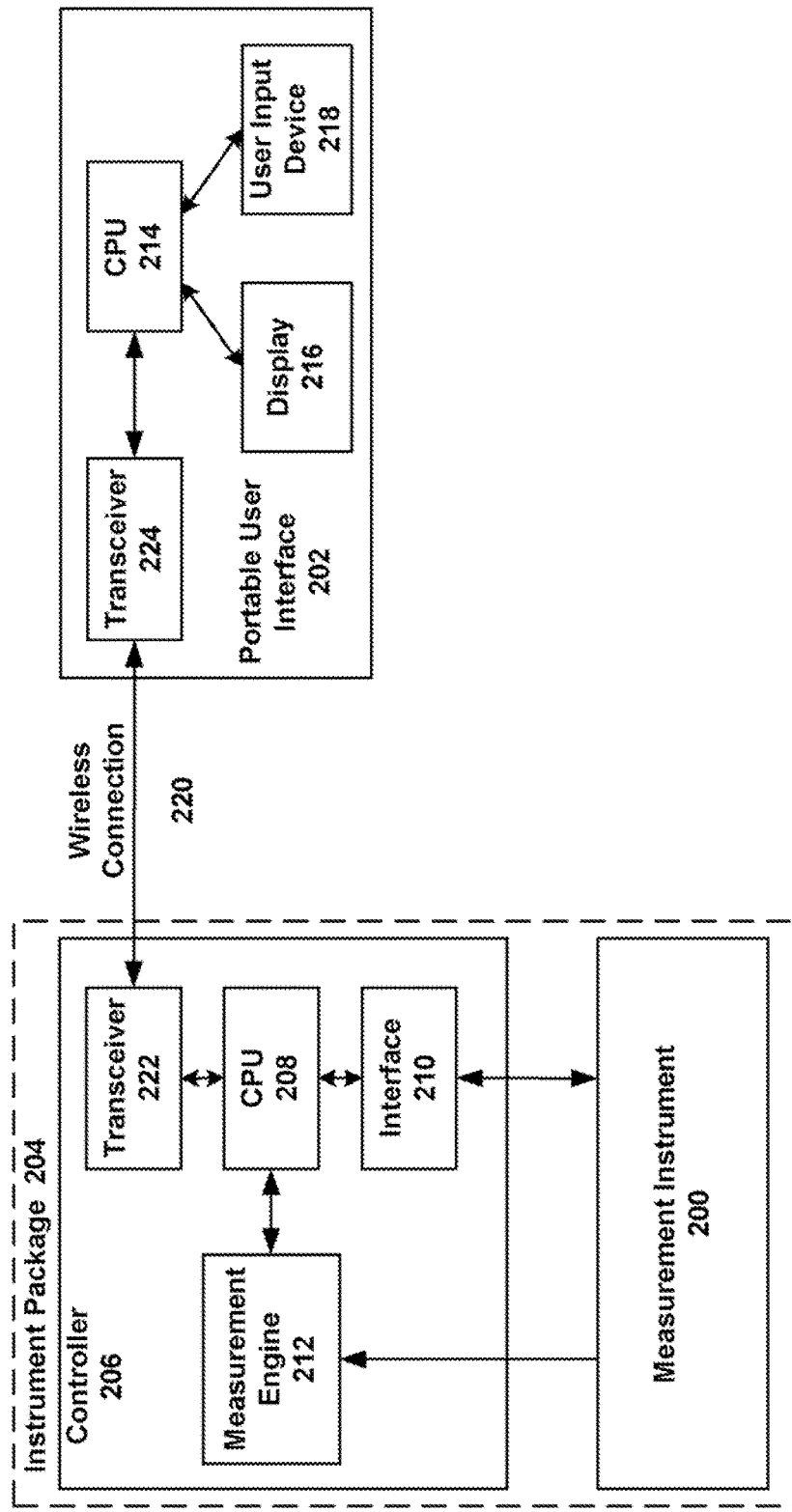
FIG. 2 shows a block diagram of a test system including a portable user interface, in accordance with an embodiment.

FIG. 2 shows a block diagram of a test system including a portable user interface, in accordance with an embodiment. In accordance with an embodiment, real time monitoring and control of a measurement instrument 200 can be provided using a portable user interface 202. The measurement instrument can be part of an instrument package 204 which includes both the measurement instrument and a controller 206. The controller includes a processor 208, such as a CPU, and an interface 210 which connects the controller to the measurement instrument. The controller also includes a measurement engine 212 which receives measurement data from the measurement instrument.

In accordance with an embodiment, the instrument package can be connected to the device or system under test and then controlled remotely by the user using the portable user interface. The portable user interface can include a processor, such as CPU 214, a display 216 and a user input device 218. The portable user interface can connect wirelessly 220 to the controller using one or more wireless transceivers. For example, the wireless connection linking the portable user interface can be effected using two transceivers: transceiver 222 at the controller and transceiver 224 at the portable user interface. Different wireless transceivers can be used depending on particular application needs, such as a bluetooth transceiver, an industrial, scientific and medical (ISM) transceiver, a ZigBee transceiver, or any wireless transceiver operable to communicate over one or more wireless frequencies. Additionally, a wireless transceiver operable to communicate selectively over multiple frequencies can be used across a range of applications where interference can become an issue i.e., if one wireless frequency is causing interference then a different, non-interfering frequency can be selected, either automatically or at the direction of a user.

The wireless transceivers used to communicate between the portable user interface and the controller should be selected to have sufficient power such that measurements can be initiated from a distance that is consistent with the expected usage of the device. For example, in a system designed to measure passive intermodulation (PIM), the transceivers used should have enough power to communicate between the measurement engine, located inside a base station, and the user controlling it using the portable user interface from atop the base station tower. Using the wrong or inadequate transceiver setup for a particular application can make wireless communications difficult or impossible in that particular application. Such power and range demands are application specific, but can include a range of several hundred to several thousand meters.

In accordance with an embodiment, one such wireless transceiver that can be used can operate in license-free wireless bands including the 900 MHz and 2.4 GHz ISM bands. This provides frequency diversity, ensuring that the transceiver does not operate at the same frequency that is being measured. Additionally, transmit power for such a transceiver can vary between 1 mW and 1 W, ensuring communication between a technician who may be outside climbing a tower and the measuring engine attached to the cable in an enclosed area. Furthermore, the transceiver can support data rates of up to 250 kbps, allowing for a real-time user interface. Multi-channel capability also allows for more than one transceiver pair to work in the same vicinity. Optionally, the transceiver can support encryption, for example 128 or 256 bit AES, for applications where secure data is needed.

Figure 3:
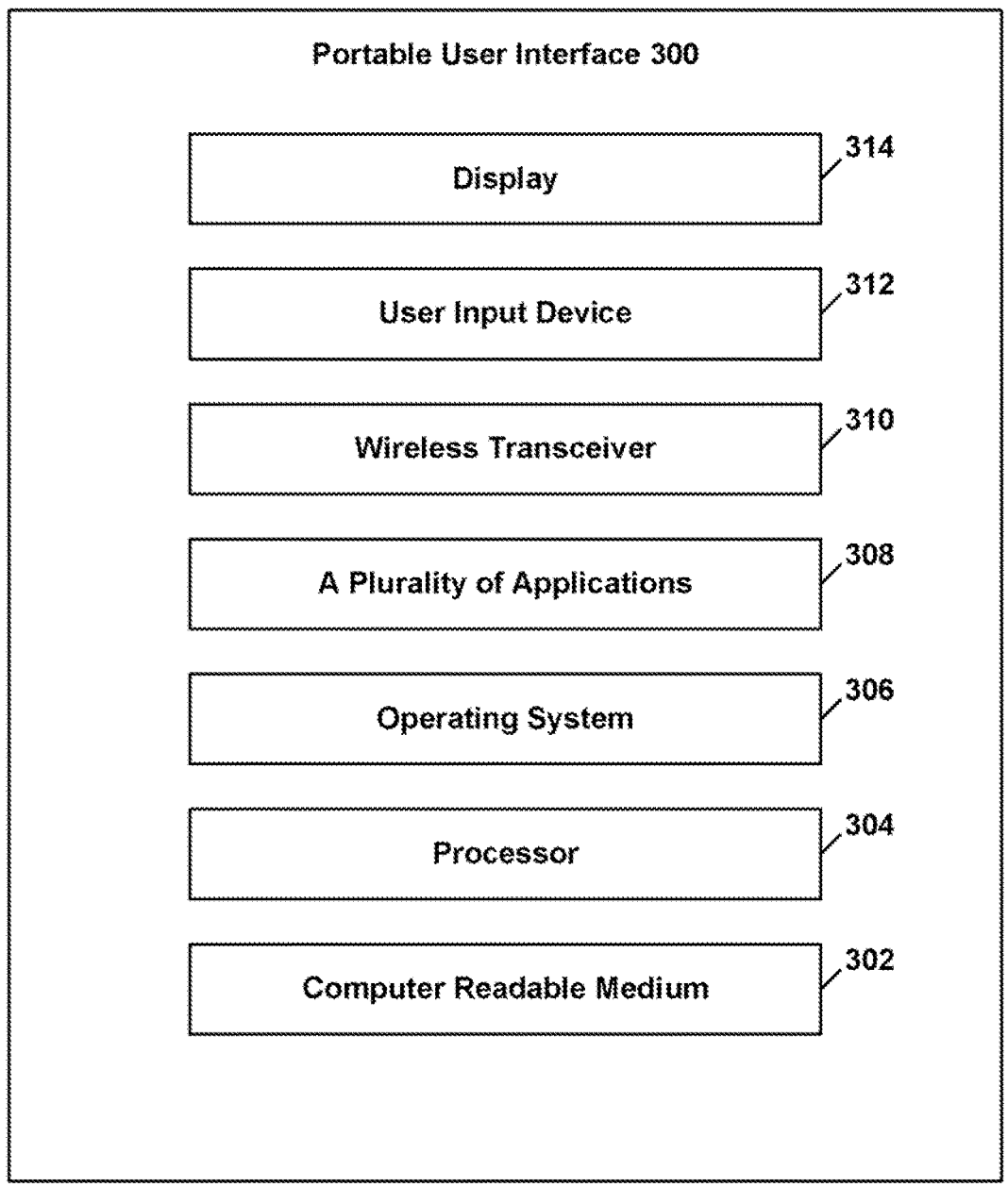
FIG. 3 shows a block diagram of a portable user interface, in accordance with an embodiment.

FIG. 3 shows a block diagram of a portable user interface, in accordance with an embodiment. Portable user interface 300 includes a computer readable medium 302 and processor 304 operating thereon. The portable user interface includes an operating system 306, such as a mobile operating system like Windows CE, Windows Mobile, iOS, Android, or other mobile operating system. The portable user interface also includes a plurality of applications 308. Each application can correspond to a different measurement instrument. This enables a single portable user interface to be used with a plurality of different measurement instruments and thus can reduce the amount of equipment that a user or technician must carry with them from site to site.

The portable user interface also includes at least one wireless transceiver 310 which can include one or more transceivers as are generally known, including but not limited to Bluetooth, ZigBee, and ISM. The wireless transceiver can be selected based on the frequency or frequencies over which it communicates to minimize interference with the device or system under test. The portable user interface also includes a user input device 312 and a display 314. The user input device can include a keyboard and an array of buttons including one or more hard or soft keys. In accordance with an embodiment the user input device and display can be combined into a touch screen or similar device which enables the user to directly interact with and control the portable user interface using the display.

Figure 4:
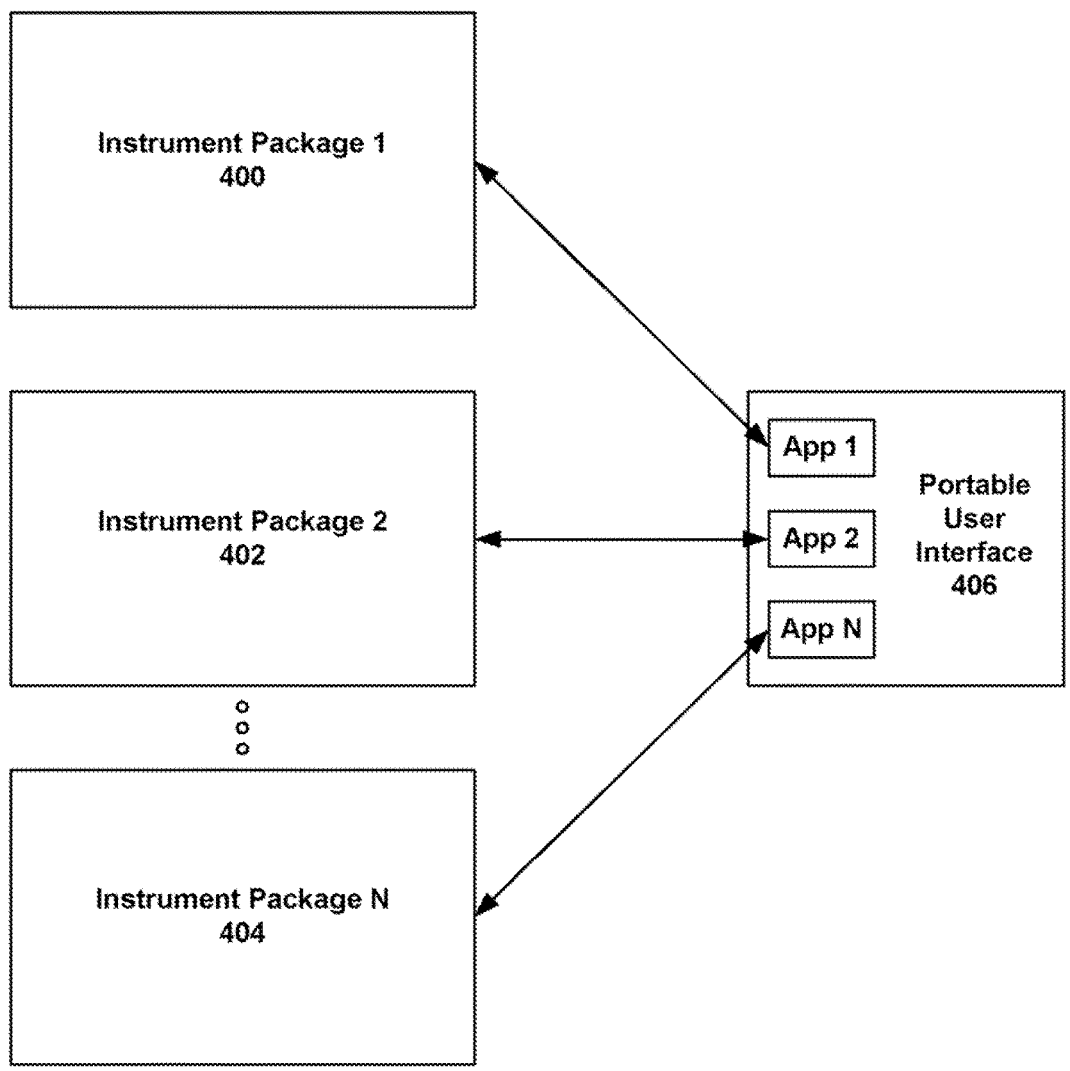
FIG. 4 shows a block diagram of a wireless test system, in accordance with an embodiment.

FIG. 4 shows a block diagram of a wireless test system, in accordance with an embodiment. The wireless test system includes a plurality of instrument packages, 400-404, each including a different measurement instrument. Portable user interface 406 is operable to control each of the measurement instruments, enabling a user or technician to test multiple systems, using different measurement instruments, remotely, using a single portable user interface. Each instrument package is associated with a different application, indicated as App1, App2 and AppN, executing on the portable user interface. The user can select an application on the portable user interface and use the controls and commands provided therein to control and monitor its associated instrument package.

Each application can selectively utilize the available hardware in the portable user interface. For example, where known interference exists between a particular wireless band and the signals which are being tested, an application can automatically select a different wireless transceiver, or cause the currently used wireless transceiver to transmit over a different frequency band. Additionally, in situations where a technician may want to use multiple test instruments at once, the portable interface can utilize multiple applications at once (i.e., multitasking), which enables the technician to switch between applications in real time.

Figure 5:
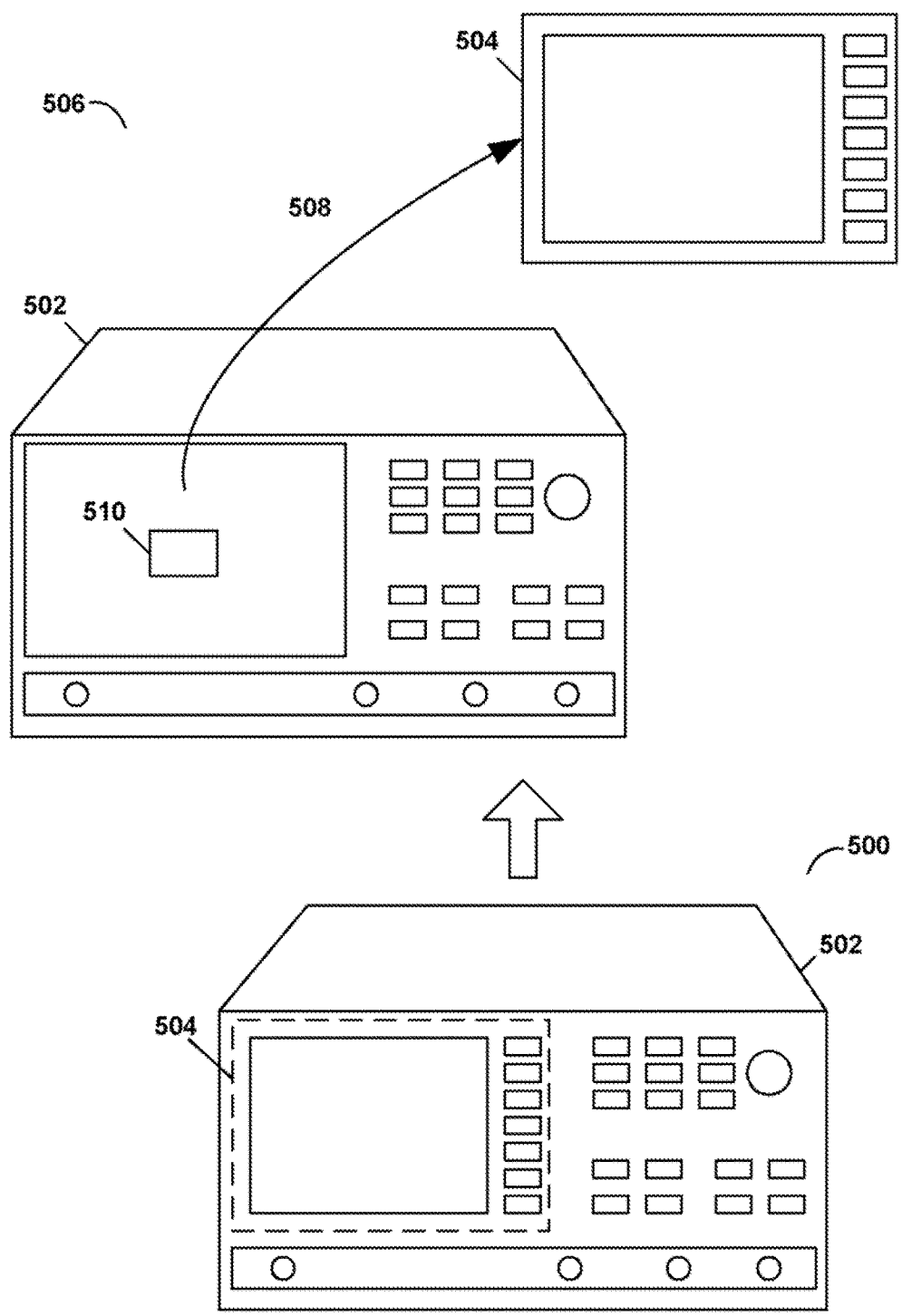
FIG. 5 shows a test system with a portable user interface, in accordance with an embodiment.

FIG. 5 shows a test system with a portable user interface, in accordance with an embodiment. Test system 500 includes base unit 502 and portable user interface 504. As shown, in test system 500 the portable user interface is secured to the base unit. While in this configuration, the test system can be operated as a standalone, complete instrument. The user can interact with test system 500 using the portable user interface, secured to the base unit, and a variety of hard and soft keys, as well as other input methods, incorporated into the base unit. Additionally, as shown in test system 506, the portable user interface is removable 508. In this configuration, the portable user interface can be used to control the base unit, while freeing the user to move about as needed. When testing is complete, or once portability is no longer a requirement, the portable user interface can be returned to the base unit where it can be reconnected at port 510. Port 510 can allow for additional data connectivity and control between the portable user interface and the base unit as well as charging of the internal battery in the portable user interface 504. Port 510 can also ensure that the portable user interface is secured to the base unit correctly, for example the correct alignment and orientation of the user interface. Additional latches or other securing mechanisms can also be used to ensure a secure coupling between the portable user interface and the base unit.

The portable user interface can be physically coupled to the base unit in a housing, built into the base unit. In accordance with an embodiment, the housing can be recessed such that the surface of the portable user interface is substantially flush with the surface of the base unit. The portable user interface can be secured into the housing using a mechanical clip, spring-loaded latch, or other mechanical coupling. The portable user interface can also be physically coupled to the base unit such that one surface of the portable user interface is immediately adjacent to one surface of the base unit. For example, a groove along the top surface of the base unit could receive the bottom surface of portable user interface such that the portable user interface is situated in a substantially upright orientation. In such a configuration the portable user interface can be coupled to the base unit via a port which provides physical support to the portable user interface and/or additional data connectivity and necessary power.

Although embodiments of the present invention have been described above with respect to microwave test equipment, the base unit can be any computing device to which remote control via a portable user interface would be advantageous. For example, in accordance with an embodiment, the base unit could be a workstation, personal computer, laptop computer or other general or specialized computing product designed for home or business use. Similarly, portable user interfaces, such as those described above, could be adapted for use in "smart" appliances and other personal and consumer goods. For example, in accordance with an embodiment, a single portable user interface could be used to manage a variety of "smart" household appliances like refrigerators, washers, dryers, dishwashers, etc. Following from the example shown in FIG. 4, each household appliance could have its own associated application executing on the portable user interface.

Although the present invention has been described above with particularity, this was merely to teach one of ordinary skill in the art how to make and use the invention. Many additional modifications will fall within the scope of the invention, as that scope is defined by the following claims.

What is claimed:

1. A measurement system for measuring an electrical response of a device to a test signal, comprising:
   a measurement instrument selectively connectable with the device via a transmission line, wherein the measurement instrument is configured to generate a radio frequency (RF) signal as the test signal, transmit the test signal to the device over the transmission line, and measure the electrical response of the device to the test signal;
   wherein the measurement instrument includes a controller for controlling the measurement instrument, the controller having a first transceiver; and
   a portable user interface including a second transceiver and configured to wirelessly communicate directly with the first transceiver of the controller via the second transceiver, wherein the portable user interface is operable to remotely display the electrical response measured by the measurement instrument in near real time and control the measurement instrument via the controller;
   a housing within the measurement instrument for selectively receiving the portable user interface;
   wherein the portable user interface is configured to be physically coupled to the measurement instrument via the housing;
   wherein when the portable user interface is physically coupled to the measurement instrument, the portable user interface is configured to communicate with the controller via a wired connection; and
   wherein when the portable user interface is physically decoupled from the measurement instrument, the portable user interface is configured to communicate with the controller via a wireless connection.

2. The measurement system of claim 1 wherein the measurement instrument is a passive intermodulation (PIM) tester.

3. The measurement system of claim 2 wherein the PIM tester and the controller are incorporated into a single instrumentation package.

4. The measurement system of claim 1, further comprising:
   a plurality of measurement instruments; and
   wherein the portable user interface includes a plurality of applications, each associated with a different measurement instrument.

5. The measurement system of claim 4 wherein the portable user interface can selectively display the electrical response measured by the plurality of measurement instruments in near real time and control the plurality of measurement instruments using the plurality of applications.

6. The measurement system of claim 4 wherein more than one of the plurality of applications can execute concurrently such that the portable user interface can display the electrical response measured by more than one of the plurality of measurement instruments in near real time and control more than one of the plurality of measurement instruments simultaneously.

7. A portable user interface usable with test instrumentation for measuring an electrical response of a device to a test signal, comprising:
   a computer including a computer readable medium and processor operating thereon;
   a user input device;

a wireless transceiver, wherein the wireless transceiver is operable to wirelessly connect the portable user interface directly to a wireless transceiver of a controller of one of a plurality of measurement instruments each selectively connectable with the device via a transmission line and configured to generate a radio frequency (RF) signal as the test signal, transmit the test signal to the device over the transmission line, and measure the electrical response of the device to the test signal;

wherein the portable user interface is adapted to remotely display the electrical response measured by the measurement instrument in near real time and control the measurement instrument via the controller;

an operating system executing on the computer; and a plurality of software applications executable on top of the operating system wherein each software application is associated with a different measurement instrument from the plurality of measurement instruments in order to allow the respective measurement instrument to be controlled via the portable user interface;

wherein the portable user interface is configured to be physically coupled to a measurement instrument from the plurality of measurement instruments via a housing within the measurement instrument;

wherein when the portable user interface is physically coupled to the measurement instrument, the portable user interface is configured to communicate with the controller via a wired connection; and wherein when the portable user interface is physically decoupled from the measurement instrument, the portable user interface is configured to communicate with the controller via a wireless connection.

8. The portable user interface for test instrumentation of claim 7 wherein the user input device includes one or more of a keyboard, an array of one or more buttons, a touchpad and a touchscreen.

9. The portable user interface for test instrumentation of claim 7 wherein the operating system is a mobile operating system.

10. The portable user interface for test instrumentation of claim 7 wherein the wireless transceiver of the portable user interface includes:
   an industrial, scientific and medical (ISM) transceiver;
   a transceiver operating on a Wireless Personal Area Network (WPAN) standard; or
   any wireless transceiver operable to communicate over one or more wireless frequencies.

11. The portable user interface for test instrumentation of claim 7 wherein the portable user interface can selectively display the electrical response measured by a plurality of measurement instruments in near real time and control the plurality of measurement instruments using the plurality of applications.

12. The portable user interface for test instrumentation of claim 7 wherein more than one of the plurality of applications can execute concurrently such that the portable user interface can display the electrical response measured by more than one of the plurality of measurement instruments in near real time and control more than one of a plurality of measurement instruments simultaneously.

13. The measurement system of claim 1, wherein a transmit power between the portable user interface and the controller is variable based on an environment in which the device is located.

14. The portable user interface for test instrumentation of claim 7, wherein a transmit power of the wireless transceiver is variable based on an environment in which the device is located.

15. The measurement system of claim 1, wherein a transmit frequency between the portable user interface and the controller is automatically adjustable by the measurement system based on a frequency of the test signal.

16. The portable user interface for test instrumentation of claim 7, wherein a transmit frequency of the wireless transceiver is automatically adjustable by the portable user interface based on a frequency of the test signal.

17. A measurement system for measuring an electrical response of a device to a test signal, comprising:
   a passive intermodulation (PIM) tester selectively connectable with the device via a transmission line, wherein the PIM tester is configured to generate a radio frequency (RF) signal as the test signal, transmit the test signal to the device over the transmission line, and measure the electrical response of the device to the test signal;
   wherein the PIM tester includes a controller for controlling the PIM tester, the controller having a first transceiver; and
   a portable user interface including a second transceiver, the portable user interface configured to wirelessly communicate with the first transceiver of the controller via the second transceiver, wherein the portable user interface is operable to remotely display the electrical response measured by the measurement instrument in near real time and control the PIM tester via the controller;
   a housing within the PIM tester for selectively receiving the portable user interface;
   wherein the portable user interface is configured to be physically coupled to the PIM tester via the housing;
   wherein when the portable user interface is physically coupled to the PIM tester, the portable user interface is configured to communicate with the controller via a wired connection; and
   wherein when the portable user interface is physically decoupled from the PIM tester, the portable user interface is configured to communicate with the controller via a wireless connection.

18. The measurement system of claim 17 wherein the PIM tester and the controller are incorporated into a single instrumentation package.

19. The measurement system of claim 17 further comprising:
   a plurality of PIM testers; and
   wherein the portable user interface includes a plurality of applications, each associated with a different PIM tester.

20. The measurement system of claim 19 wherein the portable user interface can selectively display the electrical response measured by the plurality of PIM testers in near real time and control the plurality of PIM testers using the plurality of applications.

21. The measurement system of claim 19 wherein more than one of the plurality of applications can execute concurrently such that the portable user interface can display the electrical response measured by more than one of the plurality of PIM testers in near real time and control more than one of the plurality of PIM testers simultaneously.

* * * * *